INVENTOR
ADOLF G. SCHNEIDER
ATTORNEY

April 27, 1965   A. G. SCHNEIDER   3,180,095
HYDRAULIC TORQUE CONVERTER
Filed Dec. 10, 1962   2 Sheets-Sheet 2
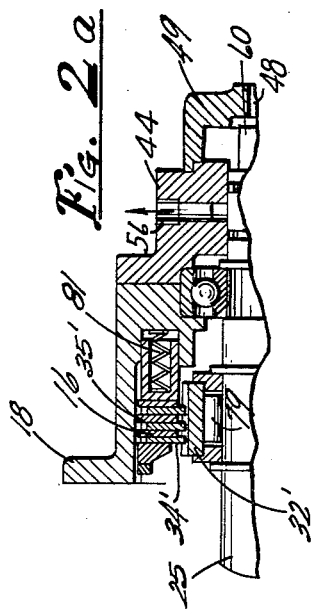
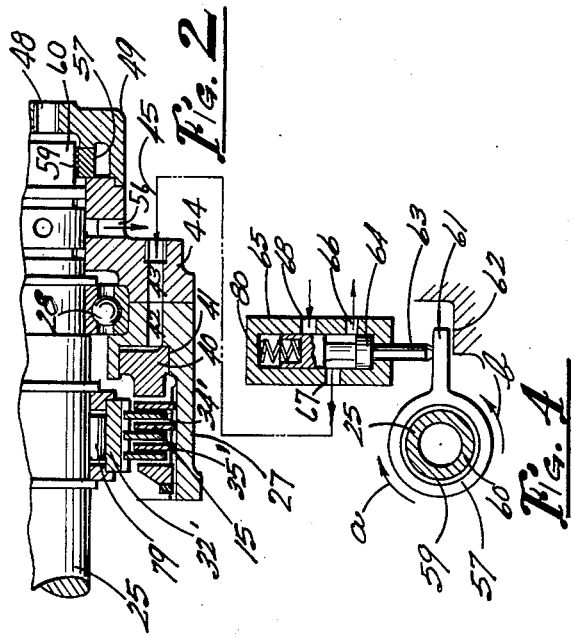
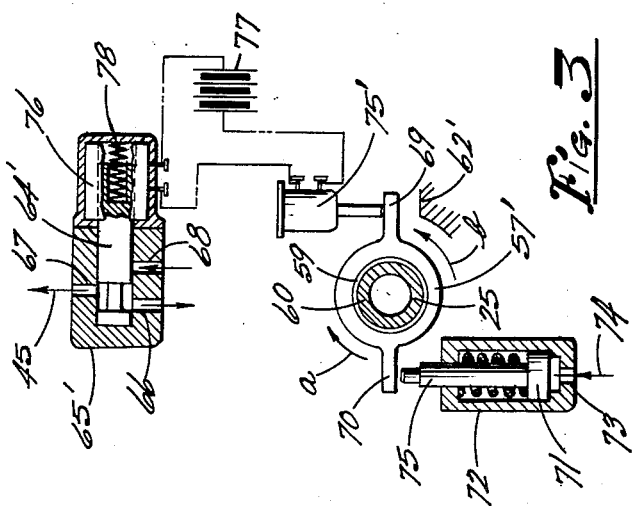
INVENTOR
ADOLF G. SCHNEIDER
ATTORNEY

United States Patent Office 3,180,095
Patented Apr. 27, 1965

3,180,095
HYDRAULIC TORQUE CONVERTER
Adolf G. Schneider, 31 Warwick Road, Muncie, Ind.
Filed Dec. 10, 1962, Ser. No. 243,373
1 Claim. (Cl. 60—54)

This invention relates to torque converters of the turbine type having bladed elements defining a closed fluid circuit, and comprising at least a pump impeller, a turbine wheel, and a reaction member.

The principal object of my invention is to provide a better way of holding the reaction member against turning and letting it turn freely when it is supposed to do so, this being a big problem especially in the larger sizes of torque converters. At the present time, one-way clutches of the roller or sprag type are used between the reaction member and the reaction member shaft, and that expedient is satisfactory for smaller lighter units, such as are used in automobiles and light trucks, but not at all satisfactory for the larger and heavier units required, for example, in earth moving equipment, heavy off the highway vehicles, and oil field installations using high-powered engines, these one-way clutches in such applications having given a great deal of trouble, so much so that fixed reaction members are now commonly installed solely to avoid the expensive repairs and prolonged shutdowns that went with the use of the ordinary one-way clutches, regardless of the serious loss in operating efficiency suffered thereby. The sudden torque reversal placed such excessive and destructive loading on these roller and sprag type clutches, making it practically impossible for them to stand up under such heavy duty service.

In accordance with my invention, I fix the reaction member on the center shaft and have this shaft extend rearwardly through a hollow turbine shaft to the rear of the torque converter unit, where I provide an easily accessible and therefore easily serviced friction disk brake, which is preferably operable hydraulically so as to provide smooth engagement and freedom from shock to insure long trouble-free service, in addition to low cost for what little servicing is needed when disks in the friction clutch require replacement.

In addition, I provide a drag-ring on the rear end of the center shaft, which, when the reaction member is subjected to reverse torque before the torque converter operates in the coupling range, automatically closes a switch that is connected in an electrical circuit to energize a solenoid to operate a spring-pressed piston valve against the action of its spring to cause the engagement of the hydraulically operated brake so as to hold the center shaft and reaction member against turning. I also provide in connection with the drag-ring a spring loaded piston that is normally in retracted position relative to the drag-ring but is responsive to a predetermined pressure build-up in the torque converter between the pump and reaction member when the torque converter enters the coupling range, whereby to overcome the spring resistance and operate said piston to operate the drag-ring in the opposite direction so as to deenergize the solenoid and accordingly release the brake and allow free turning of the center shaft and reaction member.

If the use of a one-way brake is still desired, I may incorporate it in the rear portion of the unit for easy access and easy servicing in either of the following ways:

(1) By providing a drag-ring on the end of the center shaft arranged to operate a spring loaded piston valve to an open position to deliver fluid under pressure to a hydraulically operated brake to hold the hub of the brake against turning, the one-way brake being incorporated between the shaft and said hub, whereby not only to make the one-way brake readily accessible for servicing purposes but also protected against excessive and destructive loading by virtue of the gradual application of the load through the friction clutch, or (2) By providing a one-way brake between the rear end portion of the center shaft and the hub of a continuously engaged spring loaded friction brake in which the springs apply sufficient pressure to prevent slippage during normal reaction member torque but allow slippage when the torque is greater, as upon sudden reversal of torque on the reaction member, whereby to relieve the one-way brake from the excessive and destructive loading to which it would otherwise be subjected.

In the accompanying drawings, illustrating my invention:

FIG. 2 shows a one-way brake in combination with a hydraulically operated friction brake that may be used in lieu of the brake shown in FIG. 1;

FIG. 2a is a similar view of another alternative wherein a one-way brake is used in combination with a spring-loaded, continuously engaged friction brake;

Figure 1:
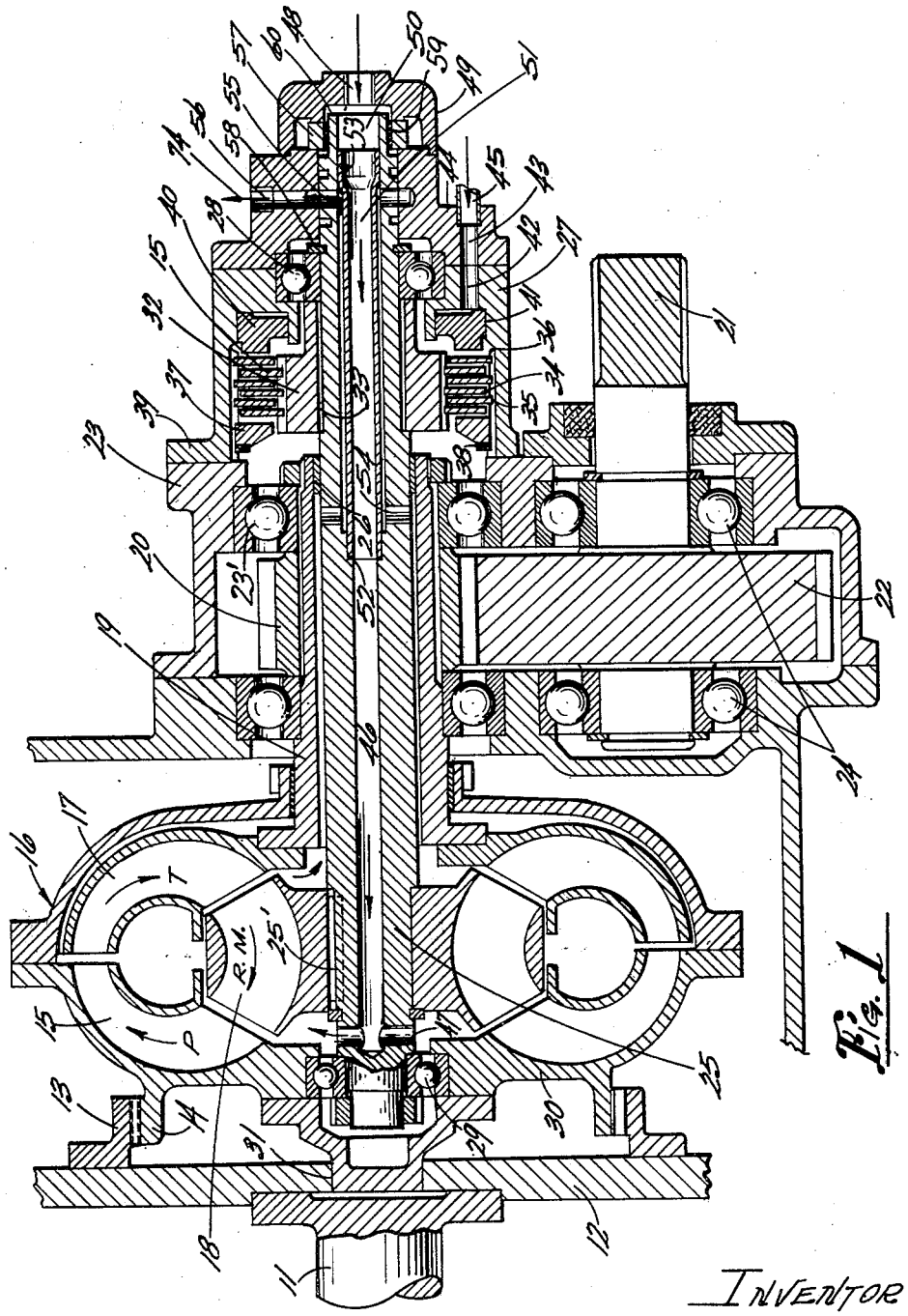
FIG. 1 is a longitudinal section through the torque converter and countershaft gear box showing the hydraulically operated friction brake at the rear of the unit for holding the reaction member against turning and releasing it to turn freely when the torque converter operates in the coupling range.

FIG. 3 is a diagram, partly electrical and partly hydraulic, showing a brake control applicable alike to FIGS. 1 and 2 and including a drag-ring in combination with a pressure responsive spring-loaded piston for turning the ring one way, and a solenoid control valve operable automatically when the switch therefor is operated by said ring when it turns the other way, and FIG. 4 is another diagram of a brake control applicable alike to FIGS. 1 and 2, showing a drag-ring and a spring-loaded control valve operable thereby and indicating, for example, how the latter is arranged to be connected with the hydraulically actuated brake of FIG. 2, the same being similarly applicable to the hydraulically actuated brake of FIG. 1.

Similar reference numerals are applied to corresponding parts throughout the views.

Referring first to FIG. 1, the reference numeral 11 designates the input or engine shaft with a flywheel 12 thereon carrying a ring gear 13, in which another ring gear 14 meshes to transmit drive to the pump impeller 15 of a torque converter, indicated generally by the reference numeral 16. The latter includes the usual turbine wheel 17, and reaction member 18. The turbine wheel 17 transmits drive to a sleeve 19 on which gear 20 is splined, whereby to drive an output or driven shaft 21 by means of gear 22. Gear box 23 provides bearing support therein for the sleeve 19, as shown at 23', and also for the shaft 21, as shown at 24. The center shaft 25, which extends rearwardly through the sleeve 19 from the reaction member 18 and has the latter keyed thereto, as indicated at 25', extends from the rear end of the sleeve 19 through a bushing 26 and is supported in the rear brake housing 27 in a bearing 28, while at its front end another bearing 29 supports the center shaft in the torque converter housing 30. The latter is centered accurately with respect to flywheel 12 in the pilot bearing 31.

In accordance with my invention, a friction disk center hub 32 is splined on the rear end portion of the center shaft 25, as indicated at 33, and the disks 34 on this hub are arranged to be engaged by disks 35 that are splined, as indicated at 36, in the front portion of the clutch housing 27. A fixed abutment ring 37 is backed up by a split retaining ring 38, the removal of which through the open front end of the clutch housing 27, when the latter is disconnected at 39 from housing 23, makes the servicing of the friction disk brake a fairly simple and inexpensive matter, in contrast to what was involved when a one-way roller or sprag type brake incorporated in the old way directly between the center shaft 25 and the reaction member 18 was employed, access to the old conventional one-way roller or sprag type brake at the center of the torque converter 16 requiring obviously substantially complete dismantling of the torque converter at many times the expense involved in the disconnection of housing 27 from housing 23. The shut-down time involved with the present construction is obviously a small fraction of that involved with the old construction. The pressure plate 40 for engagement of the friction disk brake is in the form of an annular piston working in an annular cylinder 41 provided in the rear end of the clutch housing 27, oil under pressure being delivered to this cylinder 41 behind the piston 40 through a port 42 and registering port 43 provided in a back plate 44. A flexible tube 45 for conducting the oil to and from the cylinder 41 is connected to plate 44 in communication with port 43 to supply oil under pressure to cylinder 41 and keep the brake 34–35 engaged so as to hold the center shaft 25 and reaction member 18 against turning until the coupling range is reached in the operation of the torque converter, whereupon the brake 34–35 is disengaged by release of oil pressure on piston 40, thereby permitting free rotation of reaction member 18 and center shaft 25. In this kind of operation there is no excessive loading on any of the parts such as occurred with the old roller or sprag type one-way clutches, and a unit made this way will give many times the amount of trouble-free operation as one built the old way, and hence, when, due to normal wear, it becomes necessary to replace any parts in the brake 34–35, that is a relatively simple and inexpensive matter because of the accessibility of the brake at the rear of the unit and the ease with which the brake housing 27 can be removed.

An axial hole 46 is provided in the center shaft 25 and communicates through radial ports 47 with the front of the torque converter housing 30 between the pump impeller 15 and reaction member 18, and oil for the operation of the torque converter is supplied from the rear of the unit through an opening 48 in a cap 49 that is suitably secured on the back of the plate 44, the oil thus delivered entering the rear end of a counterbore 50 that is provided in the rear end portion of the center shaft 25. A tube 51, connected at its forward end, as at 52, with the rear end of the axial hole 46, and having a flared rear end portion 53 having an oil tight fit in the counterbore 50, conducts the incoming oil into the torque converter. Radial holes 54 provided in the center shaft at the front end of the counterbore 50 conduct oil away from the back of the torque converter housing 30 from behind the reaction member 18, this oil being conducted through the sleeve 19 from the housing 30 to the ports 54, and thence through the counterbore 50 around sleeve 51 and out through other radial ports 55 provided in the rear end of the center shaft 25, this oil being conducted through a flexible tube connected at 56 to plate 44 to the source of oil supply for circulation usually through a suitable radiator for cooling before being pumped back under pressure into the housing 30. It is apparent, therefore, that the application of the friction disk brake 34–35 in the novel manner herein disclosed does not involve other complications in the design and construction of the torque converter unit, reducing the advantages gained by the changes I have incorporated. The removal of the cap 49 affords access to a small drag-ring 57 operating on the reduced rear end portion of the center shaft 25, and, after this drag-ring is removed, removal of plate 44 affords access to the split retaining ring 58. Then removal of the split retaining ring 58 from the center shaft 25 behind the bearing 28 permits removal of clutch housing 27.

Referirng now to FIG. 4, the small drag-ring 57 has a lining 59 of friction material in which the reduced end portion 60 of the center shaft 25 turns, and, when the torque converter is operating in the coupling range, the drag-ring 57 is urged in a clockwise direction, as indicated by arrow *a*, and the radial arm 61 provided on the ring engages a stop 62. However, before the torque converter reaches the coupling range the reaction member 18 has torque applied in the reverse direction tending to turn the center shaft 25 in a counter-clockwise direction, as indicated by arrow *b*, whereupon the stem 63 of the spring-loaded valve 64 in valve body 65 is moved upwardly, shutting off the return port 66 through which pressure in cylinder 41 was relieved by way of tube 45 and port 67, and placing the inlet port 68 in communication with tube 45 through port 67, so as to engage brake 34–35 and hold the center shaft 25 and reaction member 18 against turning.

In FIG. 3 I have shown another combination in which 57' is another drag-ring similar to drag-ring 57, except that it has diametrically opposed radial arms 69 and 70 on it, arm 69 being arranged to engage the stop 62' when the torque converter is operating in the coupling range and ring 57' is caused to turn in a clockwise direction, as indicated by the small arrow *a*. In this case, however, the spring-loaded piston 71 in the cylinder 72 has oil under pressure delivered thereto through port 73 from the torque converter housing through a line 74 from the front of housing 30 between the pump impeller 15 and reaction member 18 as the inlet pressure increases when the torque converter operates in the coupling range, thereby causing stem 75 on the piston 71 to push upwardly on arm 70 to open switch 75' and cause arm 69 to engage stop 62'. Prior to this operation in the coupling range, while the reaction member 18 has reverse torque applied, ring 57' is turned in a counter-clockwise direction, as indicated by arrow *b*, and arm 69 closes the switch 75' to energize solenoid 76 by connection with battery 77 and accordingly open valve 64', placing the tube 45 in communication with pressure inlet port 68 and close the return port 66. When the torque converter reaches the coupling range and the drag-ring 57' is turned in a clockwise direction by oil pressure actuation of piston 71, as previously described, switch 75' is opened, deenergizing solenoid 76, and a spring 78 returns the valve 64' to the position shown, relieving pressure in the cylinder 41 so as to allow free turning of the reaction member 18 and center shaft 25.

In FIG. 2, which shows a section of a brake 34'–35' that is similar to the brake 34–35 shown in FIG. 1, and may be used in lieu thereof, I have shown a one-way clutch 79 of the roller or sprag type between the hub 32' of the brake and the shaft 25. This one-way clutch 79 operates in the same way as the ones previously employed directly between the reaction member 18 and center shaft 25, namely, allowing free turning of the reaction member 18 and center shaft 25 with the turbine wheel 17 when the torque converter operates in the coupling range, but engaging when there is any reverse torque applied, whereby to hold the reaction member 18 and center shaft 25 against turning, but depending on brake 34'–35' being engaged to make that possible. In this combination, therefore, a certain small amount of reverse rotation can therefore occur before the brake 34'–35' is engaged fully to stop it, and hence, the friction clutch in this combination relieves the one-way clutch from the excessive and destructive loading that it would otherwise be subjected to. In other words, the drag-ring 57 turning in a counter-clockwise direction as indicated by arrow *b* in FIG. 4, operates valve 64 to deliver oil under pressure through tube 45 to cylinder 41 to engage brake 34'–35' and thereby gradually bring the reaction member 18 and center shaft 25 to a stand-still instead of having this occur abruptly, as would be necessary if there were only the one-way clutch 79 for holding shaft 25 against turning in the reverse direction. As soon as the torque converter reaches the coupling range, the one-way clutch allows the shaft 25 and reaction member 18 to turn freely in the clockwise direction, and drag-ring 57, turning in that direction also, as indicated by arrow *a* in FIG. 4, allows the valve 64 to return under action of its spring 80 to the position shown in FIG. 4, relieving pressure in cylinder 41 to disengage brake 34′–35′.

FIG. 2*a* shows a similar brake 34′–35′ in combination with a one-way clutch 79 in the same way as in FIG. 2 and this may be used in the construction of FIG. 1 in lieu of brake 34–35, but here the brake is of a spring-loaded type, as indicated at 81, so that the brake is always engaged, the springs 81 being selected in regard to pressure applied to the brake so that the brake will hold the reaction member 18 and center shaft 25 against turning for normal reaction member torque but will slip when this torque is greater, thus relieving the one-way clutch 79 from the excessive loading that it would otherwise have to bear by reason of sudden reversal of torque. No other control is necessary with this combination.

It is believed the foregoing description conveys a good understanding of the objects and advantages of my invention. The appended claim has been drawn to cover all legitimate modifications and adaptations.

I claim:

A hydraulic turbine drive comprising at least a pump impeller, a turbine wheel, and a reaction member constituting a torque converter, the turbine wheel having a hollow shaft extending therefrom and driven thereby, a gearbox into which the outer end portion of said hollow turbine shaft extends, a countershaft extending from said gear box and drivingly connected therein with the outer end portion of said hollow turbine shaft, a center shaft on which the reaction member is fixed, said center shaft extending freely through said hollow turbine shaft and projecting therefrom, a brake housing behind and removably secured to said gearbox and receiving the projecting end portion of said center shaft, a friction brake in said housing for holding said center shaft and reaction member against turning or letting the same turn, a friction drag-ring on the outer end portion of said center shaft, and means rendered operative by said drag-ring in response to torque applied thereto from said reaction member while the torque converter is operating below coupling range to keep the brake engaged until the torque converter operates in the coupling range, the brake being operable by fluid pressure and the drag-ring having two radius arms on opposite sides of center, the last mentioned means comprising an electric switch operable to closed circuit position by one of said arms when said drag-ring turns in one direction under torque applied thereto, an electrical solenoid connected in an electrical circuit with said switch and energized when said switch is closed, a spring pressed fluid control valve operable against the spring pressure by said solenoid upon energization to admit fluid under pressure to said brake to engage the same while the torque converter operates below the coupling range, and a spring returned fluid operable piston arranged to operate the other arm to turn said drag-ring in the opposite direction to retract the first arm and open said switch when the torque converter operates in the coupling range, said piston being operable at a predetermined pressure in a cylinder connected in fluid communication with the torque converter for operation of said piston under fluid pressure.

References Cited by the Examiner

UNITED STATES PATENTS

| | | | |
|---|---|---|---|
| 1,870,532 | 8/32 | Schuetz | 188—82.84 X |
| 2,042,189 | 5/36 | Rabe | 60—54 X |
| 2,196,585 | 4/40 | Gette. | |
| 2,332,593 | 10/43 | Nutt et al. | |
| 2,379,015 | 6/45 | Lysholm | 60—54 X |
| 3,007,313 | 11/61 | Snoy | 60—54 |

JULIUS E. WEST, *Primary Examiner.*